J. Lockwood,
Wire-Pointing Machine,
No. 63,270. Patented Mar. 26, 1867.
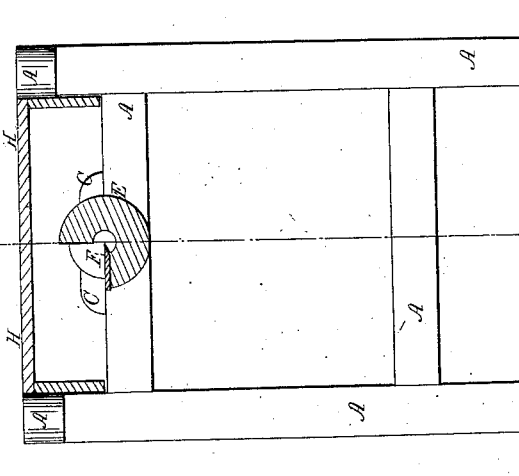
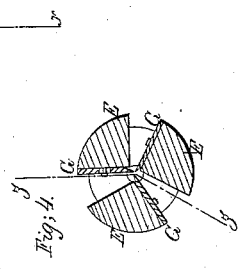
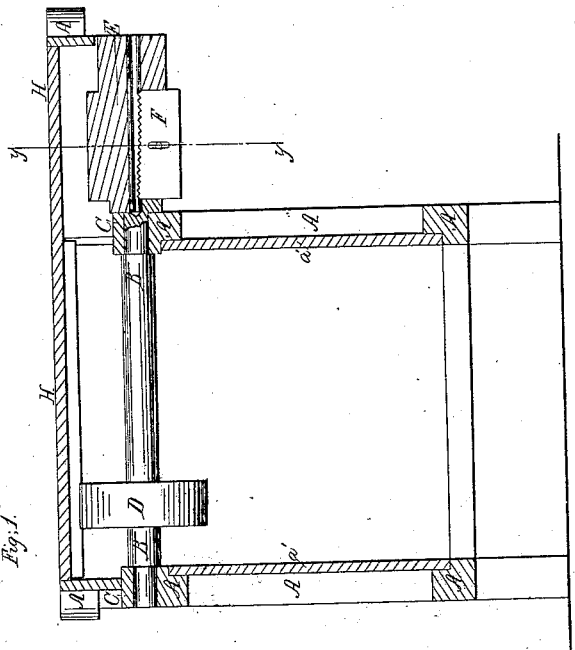
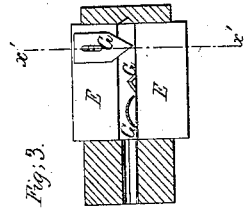
Witnesses.
Thos. Lisch
Wm. Trewin.
Inventor.
John Lockwood
Per Munn & Co.
Attorneys.

United States Patent Office.

JOHN LOCKWOOD, OF WILTON, CONNECTICUT, ASSIGNOR TO HIMSELF AND EDWIN GILBERT, OF REDDING, CONNECTICUT.

Letters Patent No. 63,270, dated March 26, 1867.

IMPROVED WIRE-POINTING MACHINE.

The Schedule referred to in these Letters Patent and making part of the same.

TO ALL WHOM IT MAY CONCERN:

Be it known that I, JOHN LOCKWOOD, of Wilton, in the county of Fairfield, and State of Connecticut, have invented a new and useful improvement in Wire-Pointing Machine; and I do hereby declare that the following is a full, clear, and exact description thereof, which will enable others skilled in the art to make and use the same, reference being had to the accompanying drawing, forming a part of this specification, in which—

Figure 1 is a vertical longitudinal section of my improved machine, taken through the line $x\ x$, fig. 2.

Figure 2 is an end view of the same partly in section, through the line $y\ y$, fig. 1.

Figure 3 is a detail sectional view, taken through the line $z\ z$, fig. 4, of a modification of the cutter-head of my improved machine.

Figure 4 is a cross-section of the same, taken through the line $x'\ x'$, fig. 3.

Similar letters of reference indicate like parts.

My invention consists of the cutter and cutter-head, in combination with the shaft, pulley, and frame of the machine, for the purpose of pointing wire for drawing, as hereinafter more fully described.

A is the frame of the machine, which may be enclosed with panels $a'$ if desired. B is the shaft, which revolves in bearings C, upon the frame A of the machine, and is driven by a band passing over the pulley D, or by any equivalent device. E is the cutter-head which is formed upon or securely attached to the end of the shaft B. The cutter-head E is perforated longitudinally for the reception of the end of the wire to be pointed, as shown in the drawings. F is the cutter, which is adjustably secured to the cutter-head E, within a notch or slot formed in the side of said cutter-head, in such a position that its cutting edge may come in contact with the end of the inserted wire and point it. The cutter F is represented in figs. 1 and 2 as having a serrated cutting edge; but the form of said edge is immaterial. If desired, the cutter F may be replaced by gouges or narrow cutters G, set in holes or slots formed in different parts of the cutter-head E, as shown in figs. 3 and 4. H is a removable cap, fitting over the top of the machine, to prevent the chips from flying about.

I claim as new, and desire to secure by Letters Patent—

The improved wire-pointing machine herein described, consisting of the frame, shaft, pulley, cutter-head, and cutter, all constructed, arranged, and operating substantially as described.

The above specification of my invention signed by me this 14th day of September, 1866.

JOHN LOCKWOOD.

Witnesses:
  JOHN DRAIN,
  DAVID H. MILLER.